United States Patent [19]

Cooperman et al.

[11] Patent Number: 4,859,877

[45] Date of Patent: Aug. 22, 1989

[54] BIDIRECTIONAL DIGITAL SIGNAL TRANSMISSION SYSTEM

[75] Inventors: Michael Cooperman, Framingham; Richard W. Sieber, Attleboro, both of Mass.

[73] Assignee: GTE Laboratories Incorporated, Waltham, Mass.

[21] Appl. No.: 140,378

[22] Filed: Jan. 4, 1988

[51] Int. Cl.[4] ............................ H03K 5/09; H03L 5/00
[52] U.S. Cl. .................................... 307/443; 307/270; 307/264; 307/540; 307/552
[58] Field of Search ............... 307/443, 264, 360, 540, 307/354, 572, 549, 552, 553, 558, 451, 491, 270, 263; 333/32; 328/173

[56] References Cited

U.S. PATENT DOCUMENTS

| | | | |
|---|---|---|---|
| 3,769,612 | 10/1973 | Yamazaki | 307/542 |
| 4,090,154 | 5/1978 | Hauchart | 333/32 |
| 4,217,553 | 8/1980 | Winebarger | 307/268 |
| 4,228,369 | 10/1980 | Anantha et al. | 307/270 |
| 4,291,356 | 9/1981 | Mathieu | 307/360 |
| 4,382,198 | 5/1983 | Ishijima et al. | 307/360 |
| 4,620,310 | 10/1986 | Lvovsky et al. | 307/270 |

OTHER PUBLICATIONS

Davidson et al., "Diode Damp Line Reflections without Overloading Logic", Electronics, 2/19/76, pp. 123–127.
Williams, "Emitter Coupled Logic to Either Long Line or Send Receive Mode Bi-Directional Convert Circuit", IBM T.D.B., vol. 18, No. 12, May 1976, pp. 4101–4103.

Primary Examiner—John S. Heyman
Assistant Examiner—Timothy P. Callahan
Attorney, Agent, or Firm—James J. Cannon, Jr.

[57] ABSTRACT

A system for transmitting digital signals over a transmission line including a driver of an inverter employing CMOS FET's and a termination of an inverter employing CMOS FET's. A sense/control circuit at the termination senses changes in the operating condition of the driver inverter and in response thereto controls the operating condition of the termination inverter. Under steady state conditions the termination inverter establishes the appropriate voltage at an output connection coupled thereto without dissipating any power.

19 Claims, 3 Drawing Sheets

BIDIRECTIONAL DIGITAL SIGNAL TRANSMISSION SYSTEM

BACKGROUND OF THE INVENTION

This invention relates to systems for transmitting digital signals. More particularly, it is concerned with systems for driving and terminating a transmission line.

Conventional high speed connections on printed circuit boards, between cabinets, or on communication links employ driver circuitry at the transmitting end and require terminations at the receiving end in order to preserve the quality of the digital signal being transmitted. Conventional termination schemes dissipate power, and in low power CMOS circuits the terminations are the major cause of power dissipation.

FIGS. 1A and 1B illustrate, in equivalent circuit diagrams, two different schemes in the prior art which are conventional for terminating transmission lines driven by driver circuitry at the transmitting end. In the circuit of FIG. 1A when, in effect, switch SA1 is closed and switch SA2 open, the voltage on the transmission line 10 becomes +5 volts. With the received voltage $V_{OUT}$ +5 volts, power is dissipated in the termination resistance RA1. When switch SA1 is open and switch SA2 closed, the voltage on the transmission line 10 becomes 0 volts. With the output voltage of the transmission line 10 $V_{OUT}$ 0 volts, no power is dissipated at the termination.

FIG. 1B illustrates an alternative conventional prior art scheme in equivalent circuit form. When, in effect, switch SB1 is closed and switch SB2 is open, the voltage $V_{OUT}$ at the receive end of the transmission line 11 is +5 volts and no power is dissipated at the termination. When switch SB1 is open and switch SB2 is closed to produce a voltage $V_{OUT}$ of 0 volts at the receive end of the transmission line 11, power is dissipated in the termination resistance RB1.

SUMMARY OF THE INVENTION

A transmission system for transmitting and receiving digital signals on a transmission line from a transmit connection to a termination connection thereof in accordance with the present invention comprises an input terminal for receiving digital signals of a first voltage level or of a second voltage level. A transmit driver means is connected between a transmit source of operating potential and a transmit point of reference potential, and is coupled to the input terminal and to the transmit connection of the transmission line. The transmit driver means is operable to change the potential at the transmit connection from the potential of the transmit point of reference potential to the potential of the transmit source of operating potential when the digital signal at the input terminal changes from the first voltage level to the second voltage level, and is operable to change the potential at the transmit connection from the potential of the transmit source of operating potential to the potential of the transmit point of reference potential when the digital signal at the input terminal changes from the second voltage level to the first voltage level.

An output terminal is connected to the termination connection of the transmission line. A termination driver means is connected between a termination source of operating potential and a termination point of reference potential, and is coupled to the termination connection of the transmission line and to the output terminal. The termination driver means has an input connection and is operable to change the potential at the termination connection and at the output terminal from the potential of the termination point of reference potential to the potential of the termination source of operating potential when the signal at the input connection thereto changes from a first input condition to a second input condition, and is operable to change the potential at the termination connection and at the output terminal from the potential of the termination source of operating potential to the potential of the termination point of reference potential when the signal at the input connection thereto changes from the second input condition to the first input condition.

A control means is coupled to the termination connection and to the input connection to the termination driver means. The control means is operable in response to the potential at the transmit connection changing from the potential of the transmit point of reference potential to the potential of the transmit source of operating potential to change the input condition at the input connection to the termination driver means from the first input condition to the second input condition whereby the termination driver means produces a potential at the output terminal equal to the potential of the termination source of operating potential. The control means is also operable in response to the potential at the transmit connection changing from the potential of the transmit source of operating potential to the potential of the transmit point of reference potential to change the input condition at the input connection to the termination driver means from the second input condition to the first input condition whereby the termination driver means produces a potential at the output terminal equal to the potential of the termination point of reference potential.

For a better understanding of the present invention, together with other and further objects, advantages, and capabilities thereof, reference is made to the following disclosure and appended claims in connection with the above-described drawings.

DETAILED DESCRIPTION

Figure 2:
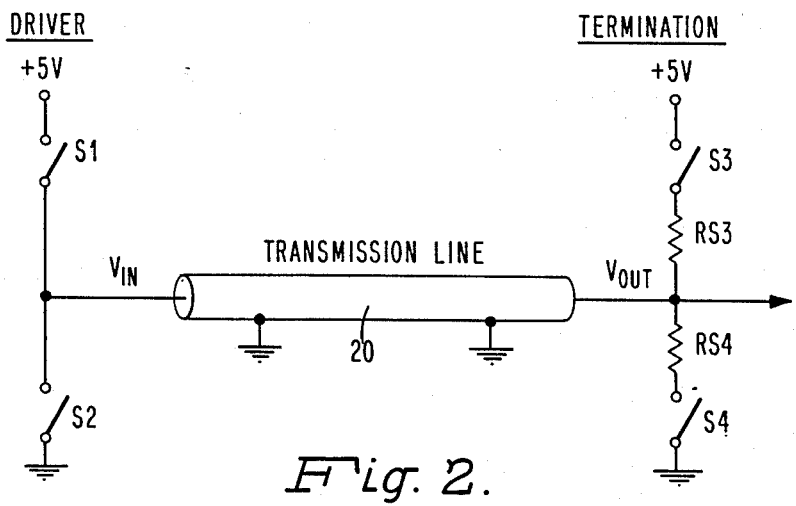
FIG. 2 is an equivalent circuit diagram useful in explaining the present invention.

FIG. 2 is an equivalent circuit diagram for illustrating objectives of the present invention. A ±5 voltage $V_{IN}$ is established at the input or transmit end of a transmission line 20 when, in effect, switch S1 is closed and switch S2 open. Alternatively when switch S1 is open and switch S2 closed, the voltage $V_{IN}$ is 0 voltage. At the receiving or termination end a series arrangement of a +5 volts source, a switch S3, and a resistance RS3 are connected to the termination or output connection of the transmission line. A resistance RS4 and a switch S4 are connected in series between the termination connection and ground.

Figure 1A:
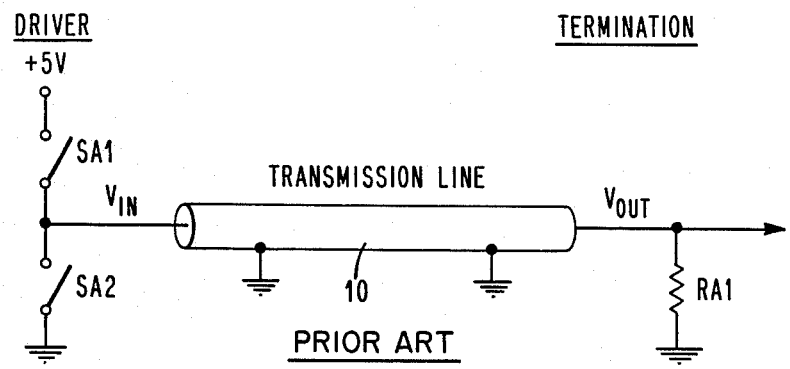
FIGS. 1A and 1B are equivalent circuit diagrams of two prior art schemes of driving and terminating a transmission line as discussed hereinabove.
Figure 1B:
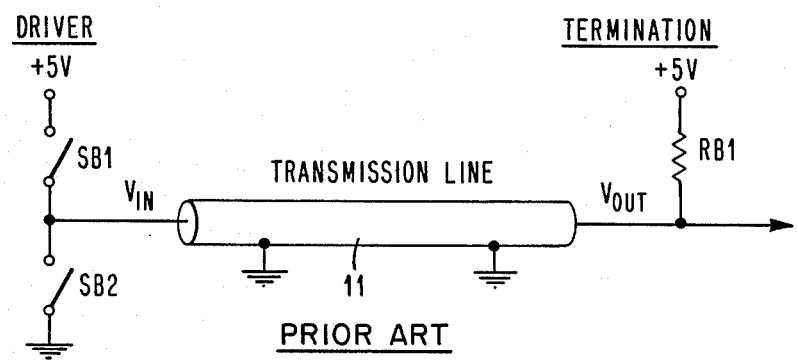

If when switch S1 is closed and switch S2 is open, switch S3 is also closed and switch S4 is also open, voltages $V_{IN}$ and $V_{OUT}$ of +5 volts are produced independently at the transmit and termination ends, respectively, of the transmission line 20. No current flows in the termination circuitry nor in the transmission line 20 and, therefore, no power is dissipated. Alternatively, when switch S1 is open and switch S2 is closed at the same time that switch S3 is open and switch S4 is closed, voltages $V_{IN}$ and $V_{OUT}$ are both 0 volts. Under these conditions no current flows in the termination circuitry nor through the transmission line 20, and thus no power is dissipated. Thus, the system of FIG. 2 distinguishes over the prior art circuits of FIGS. 1A and 1B in which power is dissipated during the transmission of a +5 volt level signal and a 0 volt level signal, respectively.

Figure 3:
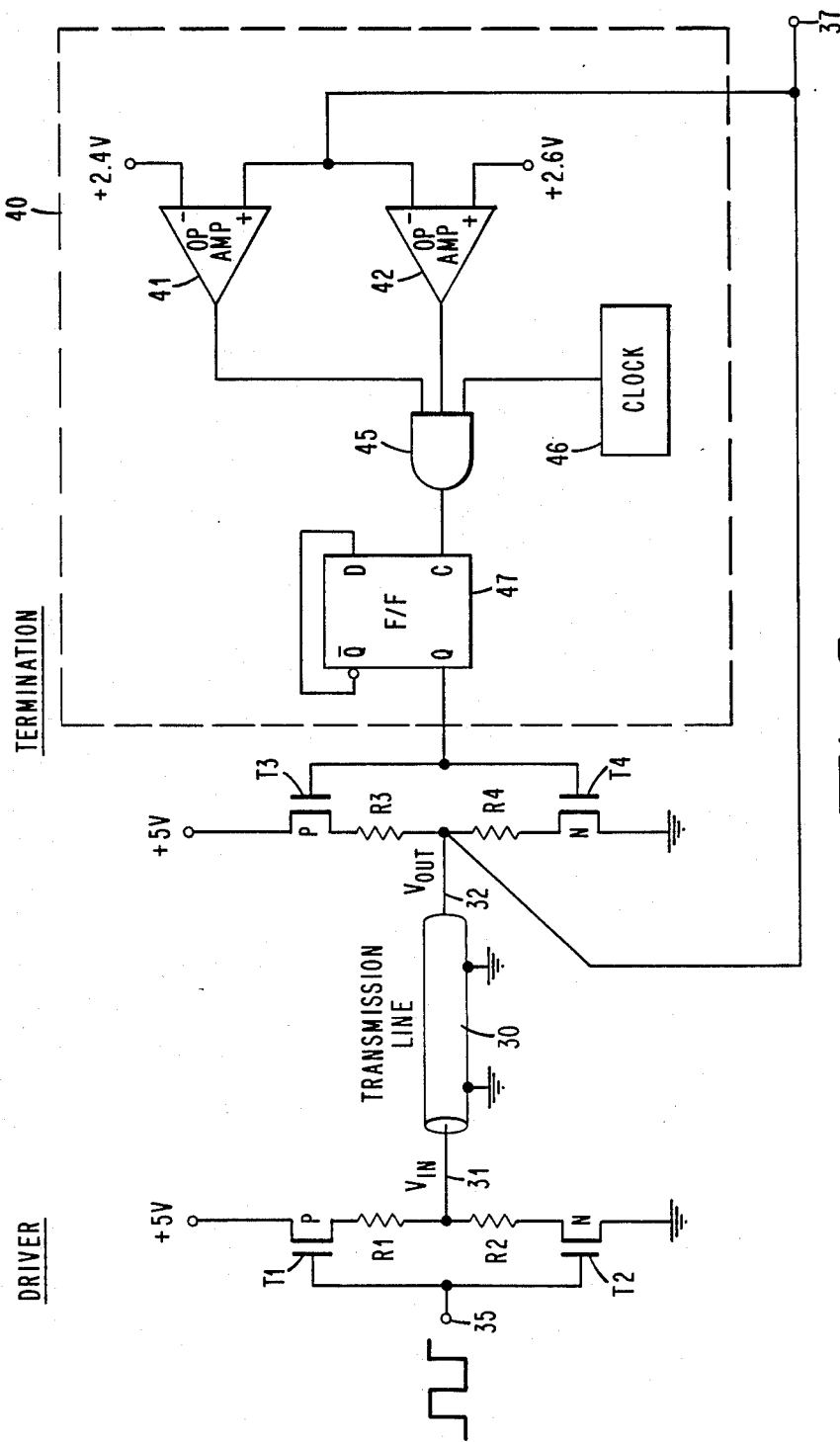
FIG. 3 is a circuit diagram of a transmission system in accordance with the present invention.

FIG. 3 illustrates a transmission system in accordance with the present invention for achieving the objectives discussed hereinabove with respect to the equivalent circuit diagram of FIG. 3. The system for transmitting and receiving digital signals on a transmission line 30 includes a driver section connected to a transmit connection 31 at one end of the transmission line 30 and a termination connection 32 at the opposite end of the transmission line 30 connected to a termination section and to an output terminal 37. In the specific example of FIG. 3, the driver section includes a transmit inverter of a complementary pair of CMOS field effect transistors (FET's) T1 and T2. A p-type transistor T1 and a resistance R1 are connected in series between a +5 voltage source and the transmit connection 31. An n-type transistor T2 and a resistance R2 are connected in series between the transmit connection 31 and ground. The gates of transistors T1 and T2 are connected together and to an input terminal 35. As shown, the transistors T1 and T2 are each connected to individual resistive components R1 and R2. Alternatively, the transistors may be so constructed as to have the requisite resistive value as will be discussed hereinafter.

The termination section of the system connected to the termination connection 32 of the transmission line 30 includes a termination inverter circuit of a p-type MOS field effect transistor T3 and a resistance R3 connected in series between a +5 voltage source and the termination connection 32. A resistance R4 and an n-type MOS field effect transistor T4 are connected in series between the termination connection 32 and ground. The gates of transistors T3 and T4 are connected together to provide an input connection to the termination inverter circuit.

The termination section also includes a sense/control circuit 40. The sense/control circuit 40 includes a first operational amplifier 41 having its + input connected to the termination connection 32 and its − input connected to a voltage source of +2.4 volts. The first operational amplifier 41 operates as is well known to produce a 1 value binary signal at its output when the input at its + input is greater than +2.4 volts, and to produce a 0 value binary signal when the input at the + input is less then +2.4 volts. A second operational amplifier 42 has its − input connected to the termination connection 32 and its + input connected to a voltage source of +2.6 volts. Thus, the second operational amplifier 42 produces 1 value binary signal at its output when the voltage at the termination connection 32 is less than +2.6 volts, and produces a 0 value binary signal when the voltage at the termination connection 32 is more than +2.6 volts.

The outputs of the operational amplifiers 41 and 42 are connected as inputs to an AND gate 45. A clock 46 is also connected as an input to the AND gate 45. The clock 46 produces square-wave cock pulses at a frequency rate which is greater than the input data rate, for example, about sixteen times the input bit rate. The output of the AND gate 45 is connected to the clock input C of a D-type flip-flop 47 connected in a latching arrangement as shown. The Q output of the flip-flop 47 is connected directly to the gates of the inverter transistors T3 and T4.

In the specific example under discussion, the a.c. impedance of the transmission line 30 is 100 ohms. Therefore, resistances R1, R2, R3, and R4 each have a value of 100 ohms. In the following discussion the transistors T1, T2, T3, and T4 function, as switches. When a transistor is conducting or "on", it is in a low impedance or "closed" condition. When a transistor is substantially not conducting or "off", it is in a high impedance or "open" condition.

The system as illustrated in FIG. 3 operates in the following manner. When the digital input signal at the input terminal 35 becomes low, transistor T1 is turned on and transistor T2 is turned off. It is assumed that at the termination section transistor T3 is off and transistor T4 is on, which would be the case if the previous input signal were high. The voltage $V_{IN}$ at the transmit connection 31 becomes +2.5 volts because of the voltage division of resistance R1 and the a.c. impedance of the transmission line which are of approximately the same value. This voltage is propagated by the transmission line 30 to the terminal connection 32 whereby $V_{OUT}$ becomes +2.5 volts. This voltage level, is within the range midway between +5 volts and ground established by the biasing voltages of +2.4 volts and +2.6 volts to the first and second operational amplifiers 41 and 42 respectively. This voltage level causes both operational amplifiers 41 and 42 to be activated to produce binary 1 value signals at their outputs. The AND gate 45 which is continuously being clocked at a rate of approximately sixteen times the input signal rate by the clock 46, produces a pulse to the C input of the latching D-type flip-flop 47. The flip-flop 47 is latched in a state causing the Q output to be low. Transistor T3 is thus turned on and transistor T4 is turned off. The voltage $V_{OUT}$ at the termination connection 32 and at the output terminal 37 becomes +5 volts shutting off the temporary current flow through the resistance R3. The voltage of greater than +2.6 volts applied to the second operational amplifier 42 causes its output to become a binary 0. Consequently the output of the AND gate 45 remains low, and the flip-flop 47 is latched with the Q output low. The output voltage $V_{OUT}$ at the output terminal 37 is high (+5 volts), inverted from the voltage at the input terminal 35. Under these steady state conditions there is no current flow in the transmission line 30 nor in transistors T1, T2, T3, and T4, nor in resistances R1, R2, R3, and R4, and consequently no power dissipation in either the driver or termination section.

When the voltage level at the input terminal 35 goes high, the operation of the switching transistors T1, T2, T3, and T4 are reversed. Transistor T1 is turned off and transistor T2 is turned on. The voltage $V_{IN}$ at the transmit connection 31 is reduced to 2.5 volts and the reduced voltage propagates along the transmission line 30 to the termination connection 32 which momentarily becomes +2.5 volts. When the voltage at the inputs to the operational amplifiers 41 and 42 is +2.5 volts, both of the operational amplifiers produce binary 1 signals to the AND gate 45. The clock 46 triggers the AND gate 45 to produce a positive-going pulse to the C input of the latching D-type flip-flop 47 causing it to change state with the Q output becoming high. This input to the termination inverter circuit turns transistor T3 off and transistor T4 on, thus producing a voltage $V_{OUT}$ of 0 volts at the termination connection 32 and at the output terminal 37. Under steady state conditions no current flows through any of transistors T1, T2, T3, or T4 or through any of resistances R1, R2, R3, or R4 and the power dissipation is zero.

Figure 4:
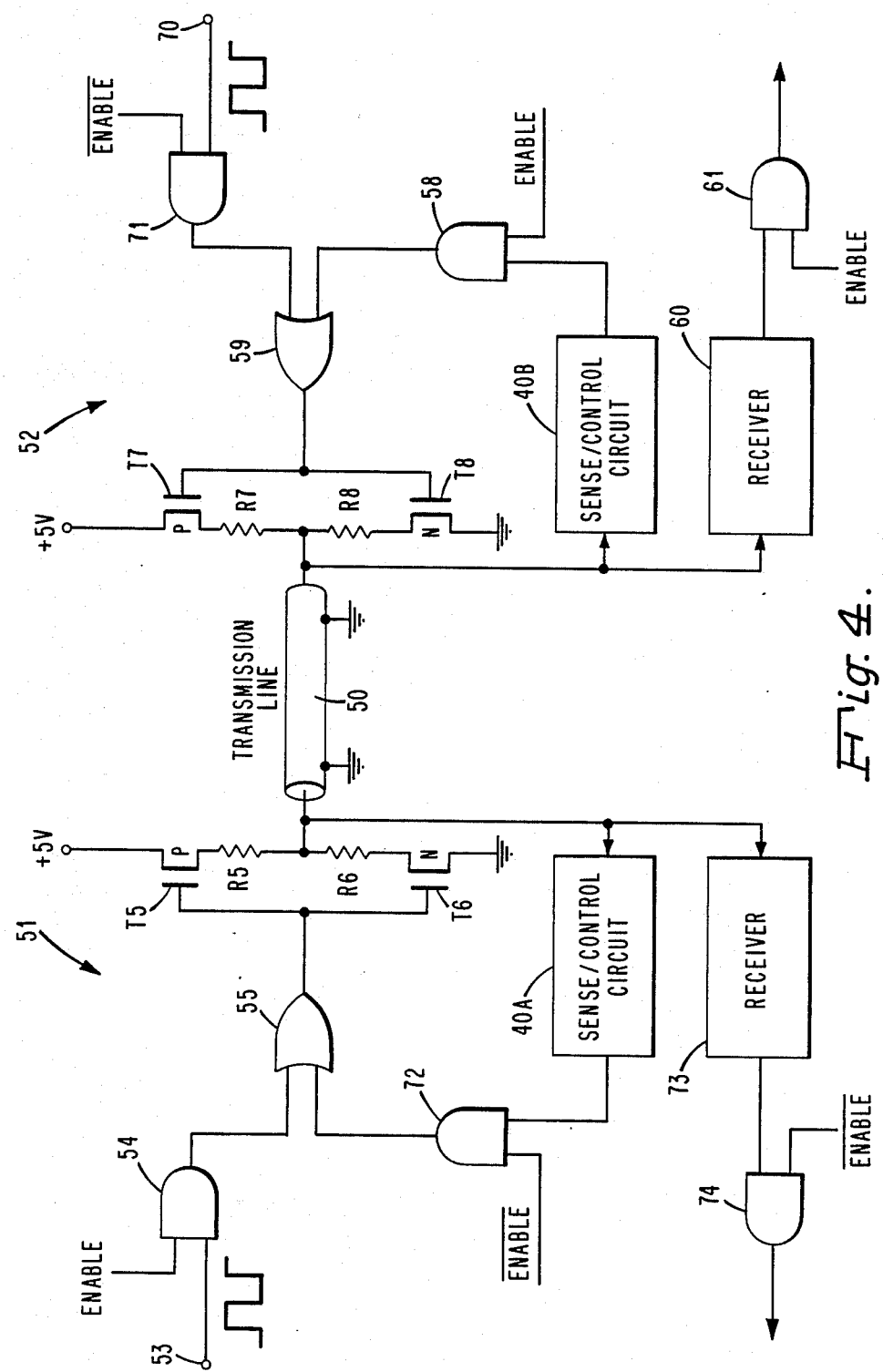
FIG. 4 is a circuit diagram illustrating a transmission system in accordance with the present invention for achieving bidirectional transmission.

FIG. 4 is a diagram illustrating a bidirectional system of transmitting digital signals along a single transmission line 50 in accordance with the present invention. The system is enabled to transmit digital information from a first section 51 to a second section 52 during an ENABLE signal, and to transmit digital information from the second section 52 to the first section 51 during an $\overline{\text{ENABLE}}$ signal. During the ENABLE signal, a digital signal applied to the input terminal 53 of the first section 51 passes through an AND gate 54 and an OR gate 55 to the gates of a complementary pair of transistors T5 and T6 connected with resistances R5 and R6 in an inverter arrangement. The juncture of resistances R5 and R6 is connected to one end of the transmission line 50.

The second section 52 also includes a complementary pair of transistors T7 and T8 together with resistances R7 and R8 connected in an inverter arrangement. The juncture of the resistances R7 and R8 is connected to the other end of the transmission line 50. During an ENABLE signal an AND gate 58 and an OR gate 59 provide a feedback path from the transmission line 50 by way of a sense/control circuit 40B, which is the same as the sense/control circuit 40 of FIG. 3, to the gates of the transistors T7 and T8. As illustrated in FIG. 4 the transmission line 50 is also connected to a receiver 60, the output of which is enabled by an ENABLE signal applied to an AND gate 61. Thus, during an ENABLE signal the first section 51 can transmit digital signals present at input terminal 53 along the transmission line 50 to the receiver 60 in the second section 52. The system operates as explained hereinabove with respect to the system of FIG. 3 to prevent power dissipation in the termination circuitry of the second section 52 when the voltage level of the input signal changes.

During an $\overline{\text{ENABLE}}$ signal the AND gate 54 prevents any signal at the input terminal 53 from reaching the inverter of T5 and T6 of the first section 51, and permits digital input signals at the input terminal 70 of the second section 52 to pass through AND gate 71 and OR gate 59 to the inverter of transistors T7 and T8 for transmission over the transmission line 50. The $\overline{\text{ENABLE}}$ signal applied to the AND gate 72 of the first section 51 completes the feedback path through the sense/control circuit 40A. The $\overline{\text{ENABLE}}$ signal also permits signals received by the receiver 73 to pass through AND gate 74. During the $\overline{\text{ENABLE}}$ signal the AND gate 58 prevents the sense/control circuit 40B from being connected to the inverter T7 and T8 and the AND gate 61 prevents output from the receiver 60. Thus, the presence of the ENABLE or $\overline{\text{ENABLE}}$ signal controls the direction of transmission of information in the transmission line 50, and a bidirectional transmission path is provided with no power dissipation during steady state conditions after changes in the signal input voltage level.

The system as described may also be used in other transmission schemes. For example, two systems as shown in FIG. 3 may be employed in a noise immune differential transmission scheme. With this scheme when the input level to one system is high, the input level to the other is low. At the receiving end it is only necessary to determine the relative polarity of the signals received over the two transmission lines. The principles of such a scheme are described in U.S. Pat. No. 4,638,473, to Michael Cooperman and Richard W. Sieber.

Thus, while there has been shown and described what is considered a preferred embodiment of the present invention, it will be obvious to those skilled in the art that various changes and modifications may be made therein without departing from the invention as defined by the appended claims.

What is claimed is:

1. A transmission system for transmitting and receiving digital signals on a transmission line from a transmit connection to a termination connection thereof comprising an input terminal for receiving digital signals of a first voltage level or of a second voltage level;

transmit driver means connected between a transmit source of operating potential and a transmit point of reference potential, said transmit driver means being coupled to said input terminal and to the transmit connection of the transmission line;

said transmit driver means being operable to change the potential at said transmit connection from the potential of the transmit point of reference potential to the potential of the transmit source of operating potential when the digital signal at the input terminal changes from the first voltage level to the second voltage level, and said transmit driver means being operable to change the potential at said transmit connection from the potential of the transmit source of operating potential to the potential of the transmit point of reference potential when the digital signal at the input terminal changes from the second voltage level to the first voltage level;

said transmit driver means includes a first transmit switching means and a first transmit resistance connected in series between said transmit source of operating potential and said transmit connection, and said transmit driver means includes a second transmit switching means and a second transmit resistance connected in series between said transmit connection and said transmit point to reference potential;

said first transmit switching means being switched to a closed condition and said second transmit switching means being switched to an open condition in response to said second voltage level at said input terminal, and said first transmit switching means being switched to an open condition and said second transmit switching means being switched to a closed condition in response to said first voltage level at said input terminal;

an output terminal connected to the termination connection of the transmission line;

termination driver means connected between a termination source of operating potential and a termination point of reference potential, said termination driver means being coupled to said termination connection and to said output terminal;

said termination driver means having an input connection and being operable to change the potential at said termination connection and at said output terminal from the potential of the termination point of reference potential to the potential of the termination source of operating potential when the signal at said input connection thereto changes from a first input condition to a second input condition, and said termination driver means being operable to change the potential at said termination connection and at said output terminal from the potential of the termination source of operating potential to the potential of the termination point of reference potential when the signal at said input connection thereto changes from said second input condition to said first input condition;

said termination driver means includes a first termination switching means and a first termination resistance connected in series between said termination source of operating potential and said termination connection, and said termination driver means includes a second termination switching means and a second resistance connected in series between said termination connection and said termination point of reference potential;

said first termination switching means being switched to a closed condition and said second termination switching means being switched to an open condition in response to said second input condition at said input connection, and said first termination switching means being switched to an open condition and said second termination switching means being switched to a closed condition in response to said first input condition at said input connection;

control means coupled to said termination connection and to the input connection to the termination driver means;

said control means being operable in response to the potential at the transmit connection changing from the potential of the transmit point of reference potential to the potential of the transmit source of operating potential to change the input condition at the input connection to the termination driver means from the first input condition to the second input condition whereby said termination driver means produces a potential at the output terminal equal to the potential of the termination source of operating potential;

said control means being operable in response to the potential at the transmit connection changing from the potential of the transmit source of operating potential to the potential of the transmit point of reference potential to change the input condition at the input connection to the termination driver means from the second input condition to the first input condition whereby said termination driver means produces a potential at the output terminal equal to the potential of the termination point of reference potential; and said control means being operable to change the voltage at the input to said termination driver means from the first input condition to the second input condition and from the second input condition to the first input condition in response to the potential at the termination connection of the transmission line being within a predetermined range.

2. A transmission system in accordance with claim 1 wherein
said first transmit switching means includes a first transmit transistor and said second transmit switching means includes a second transmit transistor complementary to said first transmit transistor; and
said first termination switching means includes a first termination transistor and said second termination switching means includes a second termination transistor complementary to said first termination transistor.

3. A transmission system in accordance with claim 2 wherein said control means includes
first operational amplifier means having an input connected to said termination connection, said first operational amplifier means being operable to produce a binary signal of one value when the input thereto is above a first potential level and being operable to produce a binary signal of the opposite value when the input thereto is below said first potential level;
second operational amplifier means having an input connected to said termination connection, said second operational amplifier means being operable to produce a binary signal of said one value when the input thereto is below a second potential level and being operable to produce a binary signal of said opposite value when the input thereto is above said second potential level;
said first and second potential levels defining said predetermined range; and
latch means coupled to said first and second operational amplifier means and to said input connections of said termination driver means, said latch means being operable to change the voltage level at said input connection from the first input condition to the second input condition and from the second input condition to the first input condition in response to coincident binary signals of said one value from both said first and second operational amplifier means.

4. A transmission system in accordance with claim 3 wherein
each of said resistances is of approximately the same resistive value; and
the a.c. impedance of the transmission line between the transmit connection and the termination connection is approximately the same as the impedance of each of said resistances.

5. A transmission system in accordance with claim 4 wherein
said transistors are MOS field effect transistors.

6. A transmission system in accordance with claim 5 wherein
the potential of the transmit source of operating potential and the potential of the termination source of operating potential are approximately the same; and
the potential of the transmit point of reference potential and the potential of the termination point of reference potential are approximately the same.

7. A transmission system for transmitting and receiving digital signals on a transmission line from a transmit connection to a termination connection thereof comprising an input terminal for receiving digital signals of a first voltage level or of a second voltage level;

transmit inverter means including a first transmit switching transistor and a first transmit resistance connected in series between a transmit source of operating potential and the transmit connection of the transmission line, and including a second transmit switching transistor, complementary to said first transmit switching transistor, and a second transmit resistance connected in series between said transmit connection and a transmit point of reference potential;

said first transmit switching transistor and said second transmit switching transistor each having a control electrode connected to said input terminal;

said first transmit switching transistor being in an open condition and said second transmit switching transistor being in a closed condition when said first voltage level is present at said input terminal;

said first transmit switching transistor being in a closed condition and said second transmit switching transistor being in an open condition when said second voltage level is present at said input terminal;

an output terminal connected to the termination connection of the transmission line;

termination inverter means including a first termination switching transistor and a first termination resistance connected in series between a termination source of operating potential and the termination connection of the transmission line, and including a second termination switching transistor, complementary to said first termination switching transistor, and a second termination resistance connected in series between said termination connection and a termination point of reference potential;

said first termination switching transistor and said second termination switching transistor each having a control electrode connected in common to an input connection thereto;

said first termination switching transistor being in an open condition and said second termination switching transistor being in a closed condition when a first input condition is present at said input connection thereto;

said first termination switching transistor being in a closed condition and said second termination switching transistor being in an open condition when a second input condition is present at said input connection thereto;

each of said resistances having approximately the same resistive value, and the a.c. impedance of the transmission line between the transmit connection and the termination connection being approximately the same as the impedance of each of said resistances;

control means coupled to the termination connection of the transmission line and to said input connection to the first and second termination switching transistors;

said control means being operable to change the input condition at said input connection to the first and second termination switching transistors from the first input condition to the second input condition in response to the potential at the termination connection being in a predetermined range approximately midway between the potential of the transmit source of operating potential and the potential of the termination point of reference potential when the digital signal at the input terminal changes from the first voltage level to the second voltage level changing the first transmit switching transistor from the open condition to the closed condition and changing the second transmit switching transistor from the closed condition to the open condition thereby causing transition current to flow through the first transmit resistance and the transmission line producing a potential within said range at the transmit connection which is propagated along the transmission line to the termination connection; and said control means being operable to change the input condition at said input connection to the first and second termination switching transistors from the second input condition to the first input condition in response to the potential at the termination connection being within said range when the digital signal at the input terminal changes from the second voltage level to the first voltage level changing the first transmit switching transistor from the closed condition to the open condition and changing the second transmit switching transistor from the open condition to the closed condition thereby causing transition current to flow through the first termination resistance and the transmission line producing a potential within said range at the termination connection.

8. A transmission system in accordance with claim 7 wherein said first transmit switching transistor and said second transmit switching transistor are complementary transistors; and said first termination switching transistor and said second termination switching transistor are complementary transistors.

9. A transmission system in accordance with claim 8 wherein said control means included first operational amplifier means having an input connected to said termination connection, said first operational amplifier means being operable to produce a binary signal of one value when the input thereto is above a first potential level and being operable to produce a binary signal of the opposite value when the input thereto is below said first potential value;

second operational amplifier means having an input connected to said termination connection, said second operational amplifier means being operable to produce a binary signal of said one value when the input thereto is below a second potential level and being operable to produce a binary signal of said opposite value when the input thereto is above said second potential level;

said first and second potential levels defining said predetermined range; and latch means coupled to said first and second operational amplifier means and to said input connection of said termination inverter means, said latch means being operable to change the voltage level at said input connection from the first input condition to the second input condition and from the second input condition to the first input condition in response to coincident binary signals of said one value from both said first and second operational amplifier means.

10. A transmission system in accordance with claim 9 wherein
said transistors are MOS field effect transistors.

11. A transmission system in accordance with claim 10 wherein
the potential of the transmit source of operating potential and the potential of the termination source of operating potential are approximately the same; and
the potential of the transmit point of reference potential and the potential of the termination point of reference potential are approximately the same.

12. A bidirectional transmission system for transmitting and receiving digital signals in both directions over a transmission line between a first connection and a second connection thereof comprising
a first input terminal for receiving digital signals of a first voltage level or of a second voltage level;
first driver means connected between a first source of operating potential and a first point of reference potential, said first driver means having an input coupled to said first input terminal and an output coupled to said first connection of the transmission line;
said first driver means being operable to change the potential at said first connection of the transmission line from the potential of the first point of reference potential to the potential of the first source of operating potential when the digital signal at the first input terminal changes from the first voltage level to the second voltage level, and said first driver means being operable to change the potential at said first connection of the transmission line from the potential of the first source of operating potential to the potential of the first point of reference potential when the digital signal at the first input terminal changes from the second voltage level to the first voltage level;
a first output terminal connected to said first connection of the transmission line;
a second input terminal for receiving digital signals of the first voltage level or of the second voltage level;
second driver means connected between a second source of operating potential and a second point of reference potential, said second driver means having an input coupled to said second input terminal and an output coupled to said second connection of the transmission line;
said second driver means being operable to change the potential at said second connection of the transmission line from the potential of the second point of reference potential to the potential of the second source of operating potential when the digital signal at the second input terminal changes from the first voltage level to the second voltage level, and said second driver means being operable to change the potential at said second connection of the transmission line from the potential of the second source of operating potential to the potential of the second point of reference potential when the digital signal at the second input terminal changes from the second voltage level to the first voltage level;
a second output terminal connected to said second connection of the transmission line;
first control means coupled to said first connection of the transmission line and to the input of the first driver means;

said first control means being operable in response to the potential at the second connection of the transmission line changing from the potential of the second point of reference potential to the potential of the second source of operating potential to change the voltage at the input of the first driver means from the first voltage level to the second voltage level whereby said first driver means produces a potential at the first output terminal equal to the potential of the first source of operating potential; and
said first control means being operable in response to the potential at the second connection of the transmission line changing from the potential of the second source of operating potential to the potential of the second point of reference potential to change the voltage at the input of of the first driver means from the second voltage level to the first voltage level whereby said first driver means produces a potential at the first output terminal equal to the potential of the first point of reference potential;
second control means coupled to said second connection of the transmission line and to the input of the second driver means;
said second means being operable in response to the potential at the first connection of the transmission line changing from the potential of the first point of reference potential to the potential of the first source of operating potential to change the voltage at the input of the second driver means from the first voltage level to the second voltage level whereby said second driver means produces a potential at the second output terminal equal to the potential of the second source of operating potential; and
said second control means being operable in response to the potential at the first connection of the transmission line changing from the potential of the first source of operating potential to the potential of the first point of reference potential to change the voltage at the input of the second driver means from the second voltage level to the first voltage level whereby said second driver means produces a potential at the second output terminal equal to the potential of the second point of reference potential;
first enabling means coupled between said first input terminal and the input of the first driver means and between said first control means and the input of the first driver means;
second enabling means coupled between said second input terminal and the input of the second driver means and between said second control means and the input of the second driver means;
said first enabling means being operable during a first enabling condition to connect said first input terminal to the input of the first driver means and to disconnect said first control means from the input of the first driver means;
said second enabling means being operable during said first enabling condition to disconnect said second input terminal from the input of the second driver means and to connect said second control means to the input of the second driver means;
said first enabling means being operable during a second enabling condition to disconnect said first input terminal from the input of the first driver means and to connect said first control means to the input of the first driver means; and said second enabling means being operable during said second enabling condition to connect said second input terminal to the input of the second driver means and to disconnect said second control means from the input of the second driver means;

whereby during said first enabling condition digital signals are transmitted from said first input terminal to said second output terminal over the transmission line; and whereby during said second enabling condition digital signals are transmitted from said second input terminal to said first output terminal over the transmission line.

13. A bidirectional transmission system in accordance with claim 12 wherein said first control means is operable to change the voltage at the input to said first driver means from the first voltage level to the second voltage level and from the second voltage level to the first voltage level in response to the potential at the first connection of the transmission line being within a predetermined range; and said second control means is operable to change the voltage at the input to said second driver means from the first voltage level to the second voltage level and from the second voltage level to the first voltage level in response to the potential at the second connection of the transmission line being within said predetermined range.

14. A bidirectional transmission system in accordance with claim 13 wherein said first driver means includes a first switching means and a first resistance connected in series between said first source of operating potential and said first connection of the transmission line and said first driver means includes a second switching means and a second resistance connected in series between said first connection of the transmission line and said first point of reference potential;

said first switching means of said first driver means being switched to a closed condition and said second switching means of said first driver means being switched to an open condition in response to said second voltage level at the input of said first driver means, and said first switching means of said first driver means being switched to an open condition and said second switching means of said first driver means being switched to a closed condition in response to said first voltage level at the input of said first driver means; and said second driver means includes a first switching means and a first resistance connected in series between said second source of operating potential and said second connection of the transmission line, and said second driver means includes a second switching means and a second resistance connected in series between said second connection of the transmission line and said second point of reference potential;

said first switching means of said second driver means being switched to a closed condition and said second switching means of said second driver means being switched to an open condition in response to said second voltage level at the input of said second driver means, and said first switching means of said second driver means being switched to an open condition and said second switching means of said second driver means being switched to a closed condition in response to said first voltage level at the input of said second driver means.

15. A bidirectional transmission system in accordance with claim 14 wherein said first switching means of said first driver means includes a first transistor and said second switching means of said first driver means includes a second transistor complementary to said first transistor; and said first switching means of said second driver means includes a first transistor and said second switching means of said second driver means includes a second transistor complementary to said first transistor 16. A bidirectional transmission system in accordance with claim 15 wherein said first control means includes first operational amplifier means having an input connected to said first connection of the transmission line, said first operational amplifier means being operable to produce a binary signal of one value when the input thereto is above a first potential level and being operable to produce a binary signal of the opposite value when the input thereto is below said first potential level;

second operational amplifier means having an input connected to said first connection of the transmission line, said second operational amplifier means being operable to produce a binary signal of said one value when the input thereto is below a second potential level and being operable to produce a binary signal of said opposite value when the input thereto is above said second potential level;

said first and second potential levels defining said predetermined range; and latch means coupled to said first and second operational amplifier means and to said input of said first driver means, said latch means being operable to change the voltage level at said input of said first driver means from the first voltage level to the second voltage level and from the second voltage level to the first voltage level in response to coincident binary signals of said one value from both said first and second operational amplifier means;

and wherein said second control means includes first operational amplifier means having an input connected to said second connection of the transmission line, said first operational amplifier means being operable to produce a binary signal of one value when the input thereto is above a first potential level and being operable to produce a binary signal of the opposite value when the input thereto is below said first potential level;

second operational amplifier means having an input connected to said second connection of the transmission line, said second operational amplifier means being operable to produce a binary signal of said one value when the input thereto is below a second potential level and being operable to produce a binary signal of said opposite value when the input thereto is above said second potential level;

said first and second potential levels defining said predetermined range; and latch means coupled to said first and second operational amplifier means and to said input of said second driver means, said latch means being operable to change the voltage level at said input of said second driver means from the first voltage level to the second voltage level and from the second voltage level to the first voltage level in response to coincident binary signals of said one value from both said first and second operational amplifier means.

17. A bidirectional transmission system in accordance with claim 16 wherein
each of said resistances is of approximately the same resistive value; and
the a.c. impedance of the transmission line between the first connection and the second connection is approximately the same as the impedance of each of said resistances.

18. A bidirectional transmission system in accordance with claim 17 wherein
said transistors are MOS field effect transistors.

19. A bidirectional transmission system in accordance with claim 18 wherein
the potential of the first source of operating potential and the potential of the second source of operating potential are approximately the same; and
the potential of the first point of reference potential and the potential of the second point of reference potential are approximately the same.

* * * * *